(12) United States Patent
Zhang et al.

(10) Patent No.: US 11,704,180 B2
(45) Date of Patent: Jul. 18, 2023

(54) METHOD, ELECTRONIC DEVICE, AND COMPUTER PRODUCT FOR STORAGE MANAGEMENT (71) Applicant: EMC IP Holding Company LLC', Hopkinton, MA (US)

(72) Inventors: Min Zhang, Shanghai (CN); Yechen Huang, Shanghai (CN); Honggang Li, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/518,943

(22) Filed: Nov. 4, 2021

(65) Prior Publication Data

US 2022/0334911 A1 Oct. 20, 2022

(30) Foreign Application Priority Data

Apr. 15, 2021 (CN) .......................... 202110406443.0

(51) Int. Cl.
*G06F 11/00* (2006.01)
*G06F 11/07* (2006.01)
(52) U.S. Cl.
CPC ........ *G06F 11/0769* (2013.01); *G06F 11/076* (2013.01); *G06F 11/0727* (2013.01); *G06F 11/0757* (2013.01); *G06F 11/0793* (2013.01)

(58) Field of Classification Search
CPC ............. G06F 11/0769; G06F 11/0727; G06F 11/0757; G06F 11/076; G06F 11/0793; G06F 11/0766; G06F 11/0754; G06F 11/0751; G06F 11/0787; G06F 11/079
See application file for complete search history.

(56) References Cited

U.S. PATENT DOCUMENTS

| 7,779,306 B1 * | 8/2010 | Philbin ............... G06F 11/0727 370/216 |
|---|---|---|
| 10,241,848 B2 | 3/2019 | Patil et al. |
| 11,106,523 B2 | 8/2021 | Bansal et al. |
| 11,237,935 B2 | 2/2022 | Upadhyay et al. |
| 2019/0095272 A1 * | 3/2019 | Haridas ............... G06F 11/0706 |
| 2021/0124661 A1 | 4/2021 | Rafey |

\* cited by examiner

*Primary Examiner* — Katherine Lin
(74) *Attorney, Agent, or Firm* — BainwoodHuang (57) ABSTRACT

Techniques for storage management involve: obtaining information indicating an error of a storage device of a data storage system; if the number of occurrences of the error within a predetermined time period exceeds a predetermined threshold, stopping obtaining the information indicating the error; and generating an event indicating whether the number of occurrences of the error within the predetermined time period exceeds the predetermined threshold for further diagnosis of the error. As a result, errors from the storage device can be automatically managed, which helps to improve the data storage system's capacity to handle different types of errors of the storage device.

19 Claims, 6 Drawing Sheets

METHOD, ELECTRONIC DEVICE, AND COMPUTER PRODUCT FOR STORAGE MANAGEMENT

CROSS-REFERENCE TO RELATED APPLICATION

This application claims priority to Chinese Patent Application No. CN202110406443.0, on file at the China National Intellectual Property Administration (CNIPA), having a filing date of Apr. 15, 2021, and having "METHOD, ELECTRONIC DEVICE, AND COMPUTER PRODUCT FOR STORAGE MANAGEMENT" as a title, the contents and teachings of which are herein incorporated by reference in their entirety.

TECHNICAL FIELD

Embodiments of the present disclosure relate to the field of data storage, and more particularly, to a method, an electronic device, and a computer program product for storage management.

BACKGROUND

With the development of data storage technologies, a storage server usually needs to manage a storage system containing a large number of disks, and the server and the multiple disks are usually connected to each other by means of a connecting line or a bus to transmit information. A data storage system usually needs to meet requirements in aspects such as data reliability and stability. In order to meet these requirements, the data storage system usually has a certain error handling capacity to detect or correct errors that occur in the system. In the new generation of storage products, for example, peripheral component interconnect express (PCIe) buses are increasingly used to connect storage devices such as fast non-volatile memory (NVMe) devices.

On the other hand, bus connection is the core of the modern server architecture, and the operation and management of many other components in the data storage system are carried out through the bus connection. In order to make the data storage system more reliable and stable, it is expected that errors from the storage devices can be handled while affecting the performance of the data storage system as little as possible.

SUMMARY OF THE INVENTION

Embodiments of the present disclosure provide an improved solution of automatically handling errors in a data storage system.

In a first aspect of the present disclosure, a method for storage management is provided. The method includes: obtaining information indicating an error of a storage device of a data storage system; if the number of occurrences of the error within a predetermined time period exceeds a predetermined threshold, stopping obtaining the information indicating the error; and generating an event indicating whether the number of occurrences of the error within the predetermined time period exceeds the predetermined threshold for further diagnosis of the error.

In a second aspect of the present disclosure, an electronic device is provided. The electronic device includes a processor and a memory coupled to the processor. The memory stores instructions that need to be executed. The instructions, when executed by the processor, cause the device to execute actions. The actions include: obtaining information indicating an error of a storage device of a data storage system; if the number of occurrences of the error within a predetermined time period exceeds a predetermined threshold, stopping obtaining the information indicating the error; and generating an event indicating whether the number of occurrences of the error within the predetermined time period exceeds the predetermined threshold for further diagnosis of the error.

In a third aspect, a computer program product is provided. The computer program product is tangibly stored on a computer-readable medium and includes computer-executable instructions that, when executed, cause a device to perform the method of the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to several example embodiments shown in the accompanying drawings. Although preferred embodiments of the present disclosure are shown in the accompanying drawings, it should be understood that these embodiments are described merely to enable those skilled in the art to better understand and then implement the present disclosure, and do not limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" denotes "at least one additional embodiment." The terms "first", "second", and the like may refer to different or identical objects. Other explicit and implicit definitions may also be included below.

In operations of a data storage system, software and/or hardware level errors may occur. The occurrence of errors may cause errors in information transmission on an I/O path of the data storage system. For example, error information is generated or information cannot be delivered to a destination. A control device is usually configured with corresponding error handling capabilities to detect or correct errors that occur in the system. For example, when an error is detected, corresponding actions may be taken to solve the error, or a warning may be issued when the error cannot be solved.

In a conventional error handling mechanism for a data storage system, if a large number of errors from storage devices occur within a short time period, that is, the so-called error flooding occurs, corresponding drivers in a kernel space will need to continuously handle these errors, thus affecting the overall performance of the data storage system. The embodiments of the present disclosure propose a new error handling and response mechanism for automatically suppressing errors in a data storage system and reporting the errors to perform higher-level recovery actions.

In an existing error handling mechanism for a storage device of a data storage system, if an error occurs in the storage device, information indicating the error will be transmitted to a control device through a switch connected to the storage device. Depending on a type of the error, uncorrectable errors, etc., a corresponding driver in a kernel space of the control device will handle the error. For example, when the error is correctable, an advanced error reporting (AER) driver in the kernel space will handle the correctable error; and when the error is uncorrectable, a downstream port error suppression (DPC) driver in the kernel space will handle the uncorrectable error. However, such error handling mechanism in a high-quality storage system still has at least the limitations listed in Table 1 below.

TABLE 1

Limitations of existing error handling technical solutions

| | Scenario 1 | Scenario 2 | Scenario 3 |
|---|---|---|---|
| Scenario description | Correctable errors occur continuously and frequently in a storage devices, namely, the so-called advanced error reporting flooding (AER flooding) | A specific storage device continuously reports correctable errors | A downstream port of a switch continuously and frequently reports uncorrectable errors from a storage device |
| Possible impact | A large number of message signal interrupts (MSI) are triggered in a short time period, and an AER driver must continuously handle errors, which seriously affects overall performance of a system | An AER driver cannot report information indicating the error to an upper-level device management module, and thus cannot check the device and provide active protection | Such occurrence of a large number of DPC interrupts in a short time period may affect the system performance and make the system unable to be protected |

As mentioned above, it is desirable to handle errors from storage devices while affecting the performance of a data storage system as little as possible. An improved mechanism for storage management based on error handling can be implemented based on the introduction of extended services. Errors may occur within storage devices serving as hardware infrastructure of a data storage system, or occur on links of the storage devices. Therefore, it is of great significance to improve how the data storage system deals with errors related to the storage devices.

According to an embodiment of the present disclosure, a storage management solution for improving automatic error handling is proposed to handle errors from storage devices in a way that affects the system performance as little as possible. In the solution, information indicating an error of a storage device of a data storage system is obtained. By calculating whether the number of occurrences of the error within a predetermined time period exceeds a predetermined threshold, it can be determined whether the occurrence of the error affects the performance of the system. If the number of occurrences of the error within the predetermined time period exceeds the predetermined threshold, obtaining the information indicating the error is stopped. Then, an event indicating whether the number of occurrences of the error within the predetermined time period exceeds the predetermined threshold is generated for further diagnosis of the error.

Through such automatic error handling method, errors from underlying storage devices may be suppressed in time, without wasting system resources (for example, memory resources, processor resources, etc.) on handling more and more errors, which is helpful to comprehensively control the data storage system's handling of errors in the entire I/O path. In addition, such automatic error handling method does not require special automatic error handling tools, and may be easily applied to appropriate storage device arrays, especially NVMe storage device arrays included in JBOD.

Example embodiments of the present disclosure will be described in detail below with reference to the accompanying drawings.

Figure 1:
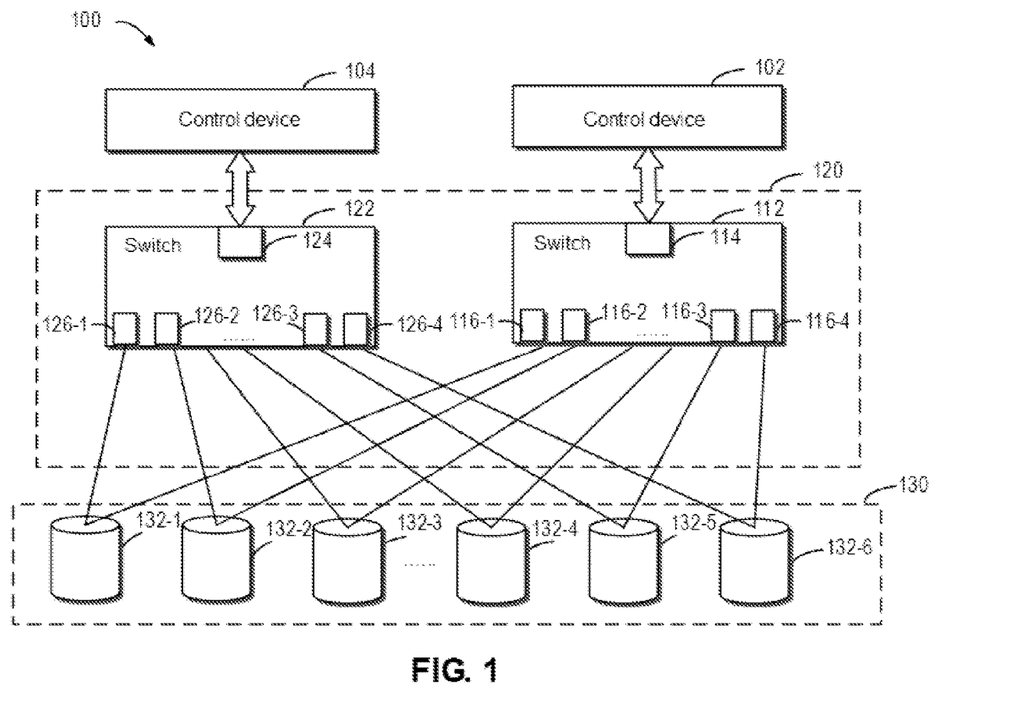
FIG. 1 shows a block diagram of a data storage system in which an embodiment of the present disclosure can be implemented.

FIG. 1 shows a schematic diagram of the architecture of data storage system 100 in which an embodiment of the present disclosure may be implemented. It should be understood that the structure and function of data storage system 100 are described for illustrative purposes only, and do not imply any limitation to the scope of the present disclosure. The embodiments of the present disclosure may also be applied to data storage systems 100 having different structures and/or functions.

As shown in FIG. 1, storage device array 130 for storing data is deployed in data storage system 100. Storage device array 130 may include a plurality of storage devices 132-1 to 132-6. For ease of description, storage devices 132-1 to 132-6 are sometimes referred to collectively or separately as storage device 132. It should be understood that the number of the storage devices shown in FIG. 1 is merely an example and not intended to limit the scope of the present disclosure.

Storage device 132 may be a non-volatile storage device or storage unit, such as a solid state drive (SSD), a magnetic disk, and so on. Storage device 132 may comply with appropriate interface specifications. For example, it may comply with an NVMe interface specification. Storage device 132 complying with the NVMe interface specification may sometimes be referred to as an NVMe device or an NVMe disk. The storage capacity of each storage device 132 may be any size.

In data storage system 100, at least one control device, such as control devices 102 and 104, is configured to control input/output (I/O) operations to storage device 132. Control devices 102 and 104 may sometimes be also referred to as storage servers or host devices. Each of control devices 102 and 104 may perform data read and write operations on storage device 132 in response to a request from a user or other devices, and may manage data access and storage in storage device 132.

Each storage device 132 may be connected to control devices 102 and 104 via just-a-bunch-of-disks (JBOD) array cabinet 120. The JBOD array cabinet is sometimes also referred to as a disk array cabinet (DAE). JBOD array cabinet 120 is an independent array cabinet outside the control device, and is used to support the interaction between the connected storage device and the control device. In some embodiments, JBOD array cabinet 120 is an external device independent of control devices 102 and 104, and may not have storage management or processing functions.

JBOD array cabinet 120 includes a plurality of switches, such as switch 112 and switch 122. Switches 112 and 122 are both connected to storage device 132 and connected to control devices 102 and 104 respectively. Thus, control devices 102 and 104 may implement I/O operation control on these storage devices 132. In the example of FIG. 1, storage devices 132-1 to 132-6 may be respectively inserted into corresponding slots (for example, U.2 slot interface) of switches 112 and 122, thereby being connected to downlink ports of switches 112 and 122. For illustrative purposes, only example downlink ports 116-1 to 116-4 of switch 112 and example downlink ports 126-1 to 126-4 of switch 122 are shown in FIG. 1. However, it should be understood that there may be more downlink ports.

Switches 112 and 122 also include uplink ports 114 and 124 for connection to corresponding control devices 102 and 104. For ease of description, downlink ports 116-1 and 116-2 of switch 112 are sometimes collectively or respectively referred to as downlink port 116, and downlink ports 126-1 and 126-2 of switch 122 are sometimes collectively or respectively referred to as downlink port 126.

In the present disclosure, ports connecting switches and control devices are referred to as uplink ports, and ports connecting switches and storage devices are referred to as downlink ports. The "uplink port" and "downlink port" here are not intended to limit the direction of data transmission. In other words, through the downlink ports, the storage devices may send data to the switches, and the switches may also send data to the storage devices. Similarly, through the uplink ports, the control devices may send data to the switches, and the switches may also send data to the control devices. As switches, the uplink ports and the downlink ports perform data communication therebetween according to internal switching structures so that the data is forwarded to corresponding destinations.

The redundant design based on multiple switches may ensure that when a certain switch in JBOD array cabinet 120 fails, storage devices 132 may be accessed via other switches. Although FIG. 1 shows two switches 112 and 122, there may be more switches to further improve redundancy. In addition, although FIG. 1 shows a dual switch-dual control device structure, in some embodiments, a single storage device may be connected to two or more switches to perform I/O access to storage device 132 via different switches respectively.

In some embodiments, the interconnection between storage device 132 and switches 112 and 122 and the interconnection between switches 112 and 122 and control devices 102 and 104 may be based on a bus. When the bus is a peripheral component interconnect express link or a PCIe bus, switches 112 and 122 may be PCIe switches. PCIe switches 112 and 122 may communicate with storage device 132 and control devices 102 and 104 based on a PCIe protocol.

Figure 2:
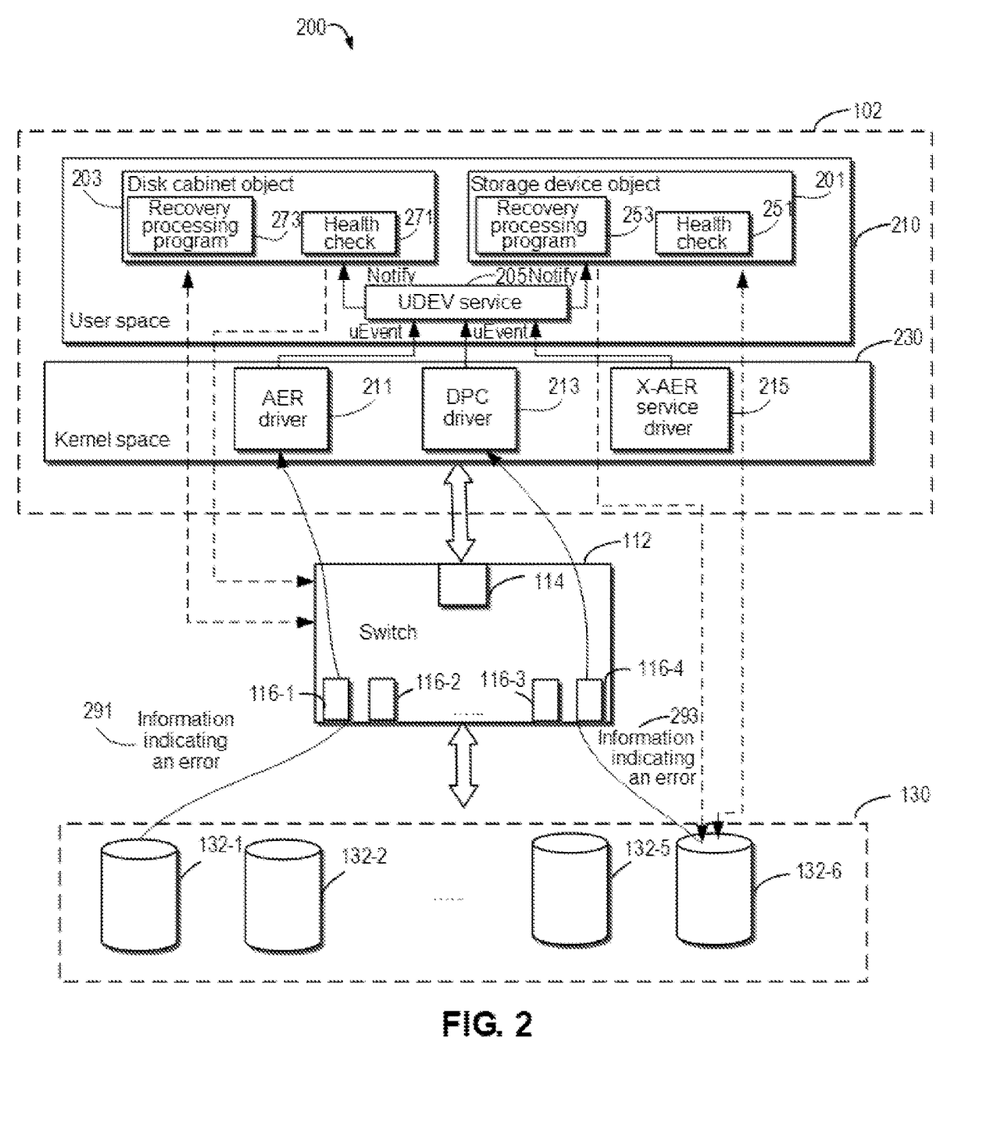
FIG. 2 shows a general schematic diagram of a solution for automatically processing errors from storage devices in Unity, an enterprise storage product, according to an embodiment of the present disclosure.

How to realize the automatic error handling of the data storage system will be discussed below with reference to FIG. 2. FIG. 2 shows a general schematic diagram of a solution for automatically processing errors from storage devices in Unity, an enterprise storage product, according to an embodiment of the present disclosure. It should be understood that the storage management solution for error handling in the embodiments of the present disclosure can be applied to other data storage systems with dual switches or multiple switches.

In FIG. 2, control device 102 in data storage system 200 (i.e., data storage system 100 in FIG. 1) includes user space module 210 and kernel space module 230. In kernel space module 230, AER driver 211 is generally used to handle correctable errors, such as AER correctable errors; and DPC driver 213 is generally used to handle uncorrectable errors, such as DPC interrupt errors. Compared with existing error handling technical solutions, the key to the improvement made by the technical solutions of the present disclosure is the introduction of an extended advanced error reporting (X-AER) service driver in the kernel space, i.e., X-AER service driver 215 in FIG. 2, to manage AER errors and DPC interrupt errors from switch 112 and storage device 132.

In the embodiment of the present disclosure, AER driver 211 provides an architecture that supports advanced error reporting capabilities. AER driver 211 provides the following three basic functions: 1) collecting comprehensive error information when an error occurs, that is, information 291 indicating the error; 2) reporting a user event (uEvent) about the error to a user space; and 3) performing an error recovery action.

In the embodiment of the present disclosure, DPC driver 213 provides the capacity to handle DPC interrupt errors. The DPC interrupt (schematically shown as information 293 indicating the error in FIG. 2) is generally caused by an uncorrectable error (e.g., fatal errors or non-fatal errors) from downstream storage device 132.

As mentioned above, in the technical solution of the present disclosure, X-AER service driver 215 is a core module for managing errors from the storage devices. Both AER driver 211 and DPC driver 213 can call an application programming interface (API) to communicate with X-AER service driver 215 to trigger further error analysis and management. In the embodiment of the present disclosure, X-AER service driver 215 provides at least the following functions: 1) maintaining counting of a specific error at different ports of the storage devices or switches, and calculating the number of occurrences and an error rate of the specific error in a certain time period based on a preset threshold table; 2) suppressing the error by shielding the function of reporting AER errors or disabling the downstream port error suppression interrupt function in a corresponding device (storage device or switch), where "suppressing" the error herein means to stop obtaining the information indicating the error to avoid system performance degradation caused by the AER driver or DPC driver handling too many errors; 3) reporting a user event about the specific error to the user space; and 4) making the storage devices or the switches released from an error suppressing state, and restoring the AER function or DPC function in the storage devices or the switches. By introducing X-AER service driver 215 in the kernel space and making AER driver 211 and DPC driver 213 call X-AER service driver 215 to trigger error management, the functions of handling a specific error of AER driver 211 and DPC driver 213 are released to some extent, thereby realizing automatic management of different types of errors and greatly increasing the efficiency of error management.

In user space module 210, UDEV service 205 is created to monitor user events (uEvent) from kernel space 230, especially the user events from X-AER service driver 215, and UDEV service 205 will notify storage device object 201 and disk cabinet object 203 of the user events based on different types of errors. In storage device object 201, there are logic component 251 for performing hardware health check and corresponding logic component 253 for recovery processing. In disk cabinet object 203, similarly, there are logic component 271 for performing hardware health check and corresponding logic component 273 for recovery processing.

In the implementation of the present disclosure, the health check refers to a series of diagnostic test sequences that test the integrity and functionality of the storage devices. The health check may include a test of the storage devices' media. After storage device object 201 and disk cabinet object 203 issue a health check command, controllers on the storage devices or the switches will execute a series of test sequence segments on the storage devices or the switches, and report a result of each test sequence segment.

According to the embodiment of the present disclosure, when the error is uncorrectable, it may be necessary to perform a recovery action on the storage devices or the switches to handle the uncorrectable error from downstream devices. For example, when handling an uncorrectable error from the downstream devices, disk cabinet object 203 may issue a command to perform a recovery action to perform the recovery action on the switches; and similarly, storage device object 201 may issue a command to perform a recovery action to perform the recovery action on the storage devices. According to the embodiment of the present disclosure, in disk cabinet object 203, for an event related to errors from switch 112, there are multiple functions for recovering the switches, such as hardware reset through MRPC commands or IPMI commands, where the MRPC commands refer to memory-mapping-based remote program calling, and the IPMI commands are intelligent platform management interface commands. According to the embodiment of the present disclosure, in storage device object 201, for an event related to errors from storage device 132, storage device object 201 also provides various recovery actions for recovering the storage devices, such as controller reset, secondary bus reset (SBR), NVMe subsystem reset, power cycle, etc. The level of impact of these recovery actions is increasing, which means the range of components affected by low-level recovery actions is smaller than the range of components affected by higher-level recovery actions. For example, controller reset of the storage devices will only affect controllers of the storage devices within a certain time period, and will not affect controllers of the switches. In contrast, secondary bus reset will affect components connected to that secondary bus, and the impact range is significantly larger. According to the embodiment of the present disclosure, storage device object 201 provides a recovery action reporting mechanism. If the storage devices cannot be recovered by the low-level recovery actions, (error) reporting is conducted for the higher-level recovery actions. This reporting mechanism causes storage device object 201 to recover the storage devices with minimal impact on components of each level. It should be understood that the recovery action reporting mechanism of storage device object 201 is only illustrative and not restrictive, and storage device object 201 may also deploy other appropriate modules or components to implement the above-mentioned recovery action reporting mechanism.

According to some embodiments of the present disclosure, the technical solution of the present disclosure can at least handle scenarios where correctable errors occur continuously or uncorrectable errors occur continuously, such as the different scenarios indicated in Table 1.

Figure 3:
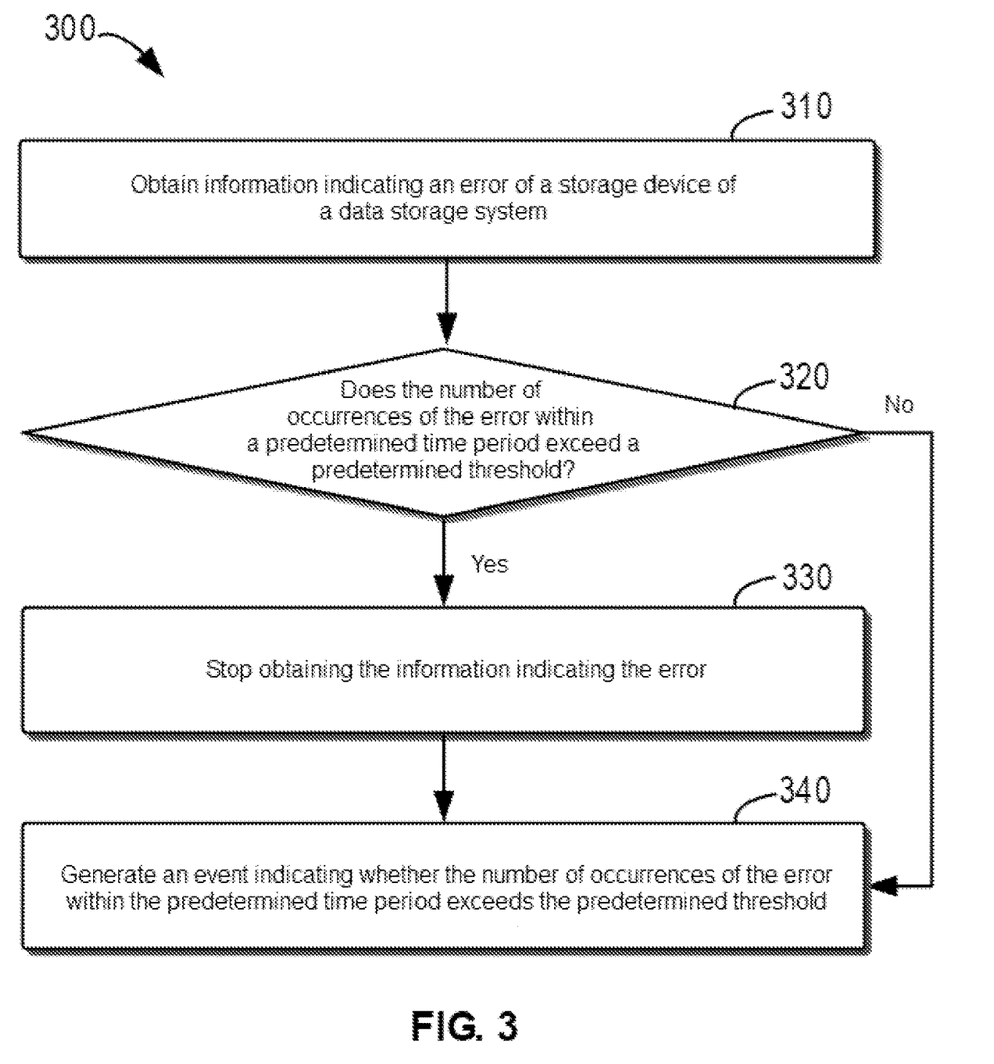
FIG. 3 schematically shows a flow chart of a method for storage management according to an embodiment of the present disclosure.

FIG. 3 schematically shows a flow chart of a method for storage management according to an embodiment of the present disclosure. Method 300 may be implemented at control device 102 shown in FIG. 1. For ease of description, method 300 is described with reference to FIGS. 1 and 2.

In block 310, control device 102 obtains information indicating an error of storage device 132 of data storage system 100 from switch 112. In block 320, whether the number of occurrences of the error within a predetermined time period exceeds a predetermined threshold is determined, if the number of occurrences of the error within the predetermined time period exceeds the predetermined threshold, the method proceeds to block 330, and if the number of occurrences of the error within the predetermined time period does not exceed the predetermined threshold, the method proceeds to block 340. According to some embodiments of the present disclosure, the determination of whether the number of occurrences of the error within the predetermined time period exceeds the predetermined threshold in block 320 is only a way to determine whether a large number of errors occur in a short time period. In addition, the determination may also be performed by calculating an error rate of a specific error in a certain time period based on, for example, a preset threshold table. If the number of occurrences of the error within the predetermined time period exceeds the predetermined threshold, in block 330, control device 102 stops obtaining the information indicating the error of storage device 132 of data storage system 100 from switch 112 (for example, 291 and/or 293 in FIG. 2). According to some embodiments of the present disclosure, if the error is correctable, stopping obtaining the information indicating the error includes shielding a function of reporting errors on storage device 132 and shielding a function of reporting errors on switch 112. According to some embodiments of the present disclosure, if the error is uncorrectable, stopping obtaining the information indicating the error includes disabling a downstream port error suppression interrupt function on downstream ports of the switches. It should be understood that since errors may occur on storage device 132 or may occur at upstream port 114 and/or downstream port 116 on switch 112, the management of possible errors should not be understood as error management only for the storage devices. In block 340, regardless of whether the obtaining of the information indicating the error is stopped, an event indicating whether the number of occurrences of the error within the predetermined time period exceeds the predetermined threshold is generated. In this way, kernel space 230 in FIG. 2 can transmit the above-mentioned event to user space 210.

Figure 4:
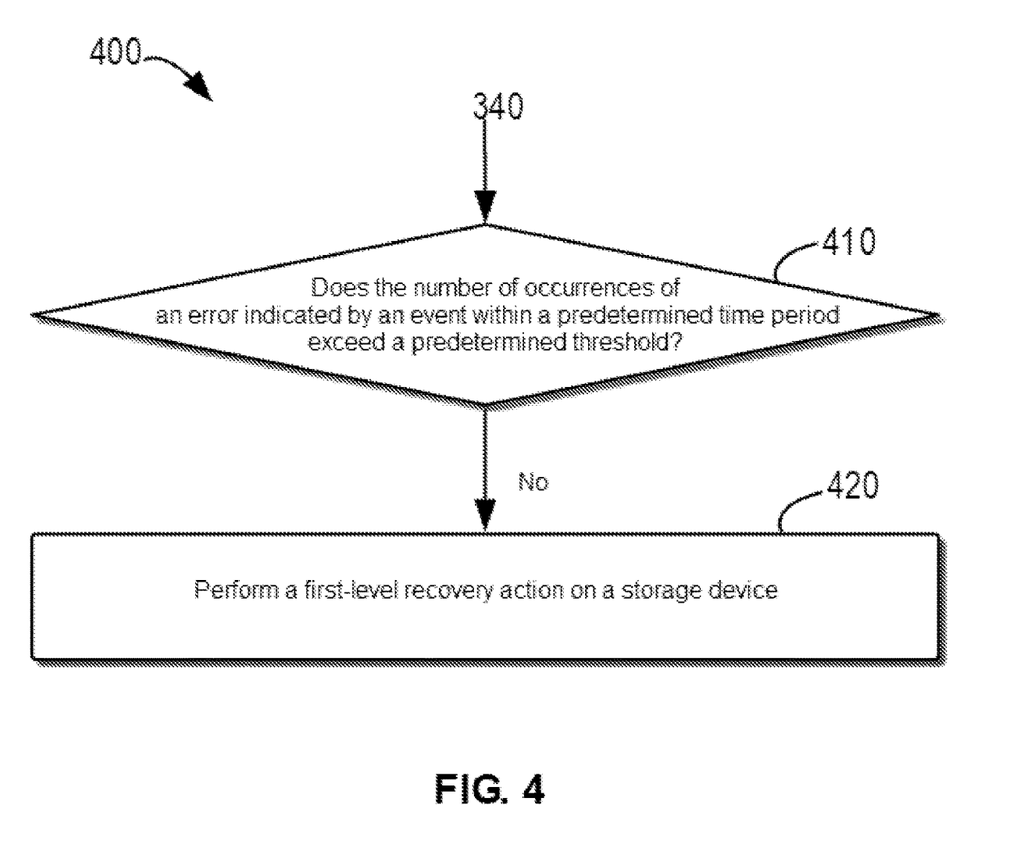
FIG. 4 schematically shows a further flow chart of a method for storage management according to an embodiment of the present disclosure.

FIG. 4 schematically shows a further flow chart of a method for storage management according to an embodiment of the present disclosure. Method 400 may be implemented at control device 102 shown in FIG. 1. For ease of description, method 400 is described with reference to FIGS. 1 to 3.

In block 410, according to block 340 of FIG. 3, X-AER service driver 215 in control device 102 determines whether the number of occurrences of an error indicated by an event within a predetermined time period exceeds a predetermined threshold. If the number of occurrences of the error indicated by the event within the predetermined time period does not exceed the predetermined threshold, method 400 proceeds to block 420, which often means that a large number of errors do not occur in a short time period, so error handling in this case will not take up too many computing resources. If all the errors that occur are correctable, it is relatively easy to handle these errors. Even if there is an uncorrectable error in the errors that occur, in block 420, performing a first-level (low-level) recovery action on storage device 132 will be sufficient to recover storage device 132. By managing a small number of errors in this way, the computing resources of data storage system 100 can be effectively saved, so as to achieve the purpose of affecting the performance of data storage system 100 as little as possible. It should be understood that method 400 may also perform higher-level recovery actions to recover storage device 132 under different circumstances.

Figure 5:
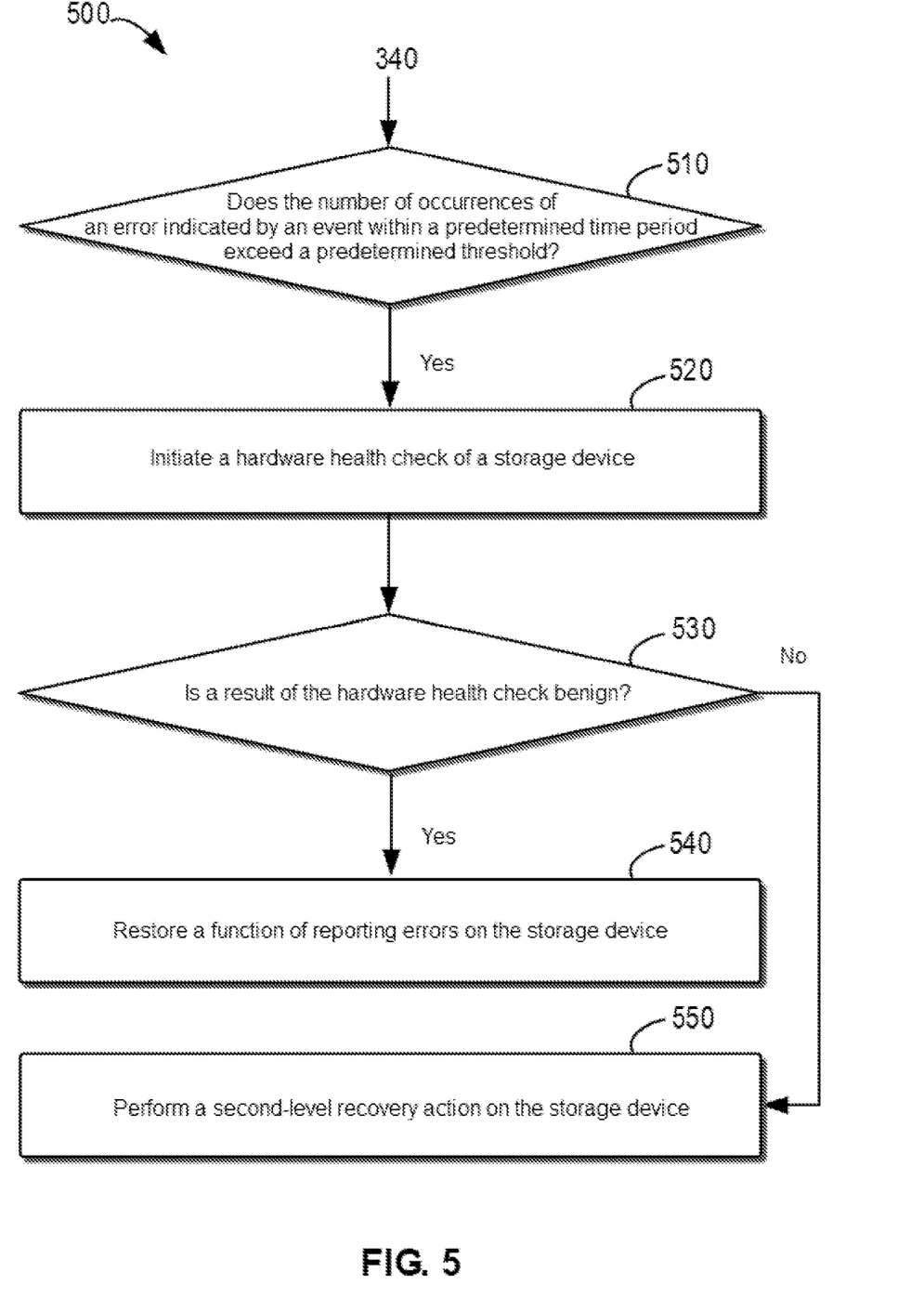
FIG. 5 schematically shows a further flow chart of a method for storage management according to an embodiment of the present disclosure.

FIG. 5 schematically shows a further flow chart of a method for storage management according to an embodiment of the present disclosure. Similar to method 400, method 500 may be implemented at control device 102 shown in FIG. 1. For ease of description, method 500 is described with reference to FIGS. 1 to 3.

In block 510, according to block 340 of FIG. 3, X-AER service driver 215 in control device 102 determines whether the number of occurrences of an error indicated by an event within a predetermined time period exceeds a predetermined threshold. If the number of occurrences of the error indicated by the event within the predetermined time period exceeds the predetermined threshold, method 500 proceeds to block 520, which often means that a large number of errors have occurred in a short time period, so in this case, in order not to occupy too many computing resources, X-AER service driver 215 will share error handling tasks of AER driver 211 and/or DPC driver 213, and activate the recovery action reporting mechanism to further diagnose and manage the errors. In block 520, storage device object 201 in user space 210 will initiate a hardware health check of storage device 132. In block 530, if a result of the hardware health check of storage device 132 is benign, method 500 proceeds to block 540, and if the result of the hardware health check of storage device 132 is not benign, method 500 proceeds to block 550. In block 540, since storage device 132 is healthy, the function of reporting errors on storage device 132 is restored. In block 550, since storage device 132 is unhealthy, which often means that storage device 132 has been damaged, a second-level (higher-level) recovery action is performed on storage device 132 to prevent further damage to storage device 132. It should be understood that method 500 may also perform recovery actions of different levels to recover storage device 132 under different circumstances.

A specific implementation of the technical solution of the present disclosure for managing error handling in different scenarios is described below based on FIGS. 1 to 5.

As described above, the technical solution of the present disclosure can at least handle scenarios where correctable errors occur continuously or uncorrectable errors occur continuously, such as the different scenarios indicated in Table 1.

According to some embodiments, without loss of generality, it is assumed that continuous correctable AER errors occur in storage device 132-1. As shown in FIG. 2, information 291 indicating the errors (for example, correctable AER messages) is continuously transmitted (reported) to AER driver 211 in kernel space 230 via downstream port 116-1 of switch 112. Since in the Unity platform, downstream port 116-1 of switch 112 supports the DPC function, only correctable AER errors from storage device 132-1 need to be considered here. In the kernel space, X-AER service driver 215 communicates with AER driver 211 to obtain information 291 indicating the errors. For each type of errors (correctable/fatal/non-fatal) therein, a calculation module in X-AER service driver 215 will calculate an error rate of a specific error within a certain time period. If the error rate exceeds a predetermined threshold in the certain time period, it means that AER error flooding occurs in storage device 132-1, X-AER service driver 215 will record the event and shield the function of reporting errors on storage device 132-1, and then a generated event indicating whether the error rate exceeds the predetermined threshold in the certain time period is reported to user space 210. It should be understood that when a generated specific event indicating that the error rate exceeds the predetermined threshold in the certain time period is reported to user space 210, the specific event is essentially a reported user event, because the specific event is used to notify corresponding storage device object 201 to handle errors from storage device 132-1 from a higher level.

When storage device object 201 in user space 210 receives the specific event, storage device object 201 will initiate a health check on storage device 132-1, and send a message to restore the function of reporting errors on storage device 132-1 to X-AER service driver 215 when there is no obvious health problem. If storage device 132-1 is indeed damaged, a certain level of recovery action needs to be performed on storage device 132-1. For example, if a certain functional failure occurs in the controller of the storage device, a certain reset action will be executed to make the function work again. For example, if some kind of media error occurs, it is necessary to notify a higher level to rewrite or remap the data in storage device 132-1, or even disable storage device 132-1 and copy the data therein to a backup storage device. If the execution of all levels of recovery actions exceeds a predetermined retry count, which often means that storage device 132-1 has been severely damaged, in this case, storage device object 201 in the user space is invalidated, and the recovery actions are stopped. It should be understood that the handling of the correctable AER errors is automatically realized through the error suppression and reporting mechanism, which not only solves the problem of AER flooding, but also does not need to occupy the computing resources of the data storage system, thereby affecting the performance of the data storage system as little as possible.

According to some embodiments, without loss of generality, it is assumed that continuous uncorrectable errors occur in storage device 132-6. As shown in FIG. 2, information 293 indicating the errors (for example, uncorrectable DPC interrupt messages) is continuously transmitted (reported) to DPC driver 213 in kernel space 230 via downstream port 116-4 of switch 112. Since in the Unity platform, downstream port 116-4 of switch 112 supports the DPC function, if a large number of DPC interrupt messages occur within a specific time period, this type of interrupt message storm may also affect the performance of the data storage system. In the kernel space, X-AER service driver 215 communicates with DPC driver 213 to obtain information 293 indicating the errors. For these uncorrectable DPC interrupt messages, a calculation module in X-AER service driver 215 will calculate an error rate of the uncorrectable errors within a certain time period. If the error rate exceeds a predetermined threshold in the certain time period, which means that the interrupt message storm occurs in storage device 132-6, X-AER service driver 215 will record the event and disable the function of reporting errors (downstream port error suppression interrupt function) on storage device 132-6, and then a generated event indicating whether the error rate exceeds the predetermined threshold in the certain time period is reported to user space 210. It should be understood that when a generated specific event indicating that the error rate exceeds the predetermined threshold in the certain time period is reported to user space 210, the specific event is essentially a reported user event, because the specific event is used to notify corresponding storage device object 201 to handle errors from storage device 132-6 from a higher level.

When storage device object 201 in user space 210 receives the specific event, storage device object 201 will initiate a health check on storage device 132-6, and send a message to restore the function of reporting errors on storage device 132-6 to X-AER service driver 215 when there is no obvious health problem. If storage device 132-6 is indeed damaged, it is necessary to perform a certain level of recovery action on storage device 132-6. For example, a power cycle operation is performed on storage device 132-6. If the execution of all levels of recovery actions exceeds a predetermined retry count, which often means that storage device 132-6 has been severely damaged, in this case, storage device object 201 in the user space is invalidated, and the execution of recovery actions is stopped. It should be understood that the handling of the uncorrectable errors is automatically realized through the error suppression and reporting mechanism, which not only solves the problem of interrupt message storm, but also does not need to occupy a large number of computing resources of the data storage system, thereby affecting the performance of the data storage system as little as possible.

Through the above discussion, the technical solution of the present disclosure not only can manage general storage device errors, but also can manage special situations caused by error flooding or error interrupt storms, so as to affect the performance of a data storage system as little as possible. It should also be understood that the technical solution of the present disclosure can be used to manage mixed types of errors from storage devices and switches.

Figure 6:
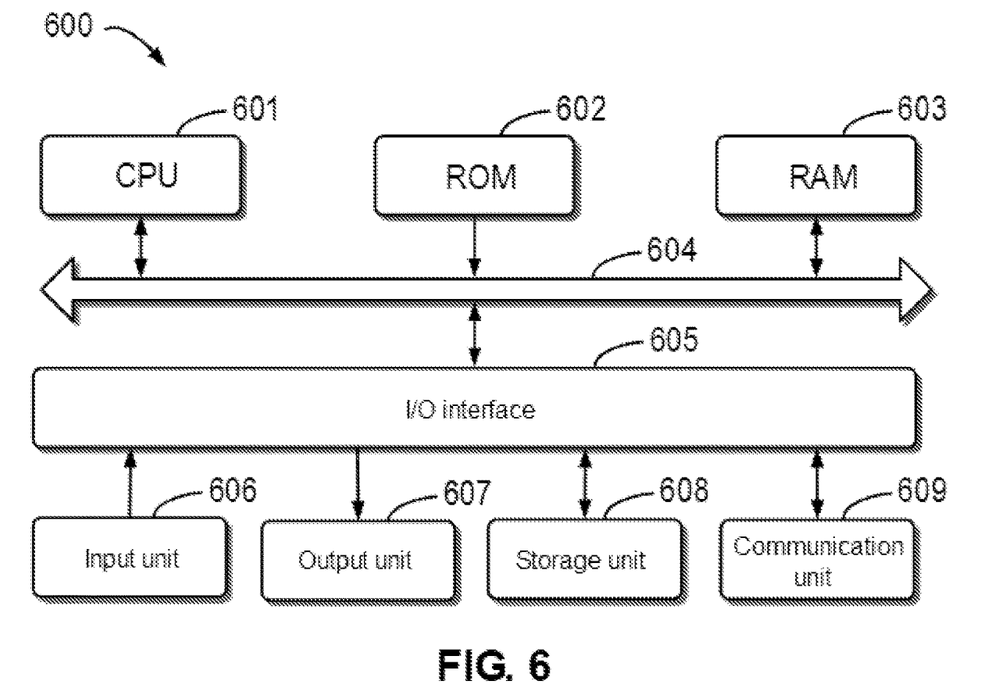
FIG. 6 shows a block diagram of an example device that can be configured to implement an embodiment of the present disclosure.

FIG. 6 is a schematic block diagram of example device 600 that may be configured to implement an embodiment of the present disclosure. Device 600 may be implemented as or included in control device 102 or control device 104 of FIG. 1.

As shown in the drawing, device 600 includes central processing unit (CPU) 601 that may perform various appropriate actions and processing according to computer program instructions stored in read-only memory (ROM) 602 or computer program instructions loaded from storage unit 608 into random access memory (RAM) 603. In RAM 603, various programs and data required for operations of device 600 may also be stored. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

Processing unit 601 performs various methods and processing described above, such as methods 300-500. For example, in some embodiments, methods 300-500 may be implemented as a computer software program or a computer program product that is tangibly included in a machine-readable medium, such as a non-transitory computer-readable medium, for example, storage unit 608. In some embodiments, part or all of the computer program may be loaded and/or installed onto device 600 via ROM 602 and/or communication unit 609. When the computer program is loaded to RAM 603 and executed by CPU 601, one or more steps of methods 300-500 described above may be performed. Alternatively, in other embodiments, CPU 601 may be configured to perform methods 300-500 in any other suitable manner (e.g., by means of firmware).

Those skilled in the art should understand that the steps of the above method of the present disclosure may be implemented by a general-purpose computing apparatus, and may be centralized on a single computing apparatus or distributed over a network composed of a plurality of computing apparatuses. Optionally, they may be implemented using program code executable by a computing apparatus, so that they may be stored in a storage apparatus and executed by the computing apparatus, or they may be made into integrated circuit modules respectively, or they may be implemented by making a plurality of modules or steps thereof into a single integrated circuit module. Thus, the present disclosure is not limited to any particular combination of hardware and software.

It should be understood that although some apparatuses or sub-apparatuses of the device are mentioned in the above detailed description, such division is merely illustrative rather than mandatory. In fact, the features and functions of two or more apparatuses described above may be embodied in one apparatus according to the embodiments of the present disclosure. Conversely, the features and functions of one apparatus described above can be embodied by further dividing the apparatus into multiple apparatuses.

The foregoing are merely optional embodiments of the present disclosure and are not intended to limit the present disclosure, and for those skilled in the art, the present disclosure can have various modifications and changes. Any modifications, equivalent replacements, and improvements made within the spirit and principles of the present disclosure shall be included in the scope of protection of the present disclosure.

The invention claimed is:

1. A method for storage management, comprising:
   obtaining information indicating an error of a storage device of a data storage system;
   if the number of occurrences of the error within a predetermined time period exceeds a predetermined threshold, stopping obtaining the information indicating the error; and
   generating an event indicating whether the number of occurrences of the error within the predetermined time period exceeds the predetermined threshold for further diagnosis of the error;
   wherein stopping obtaining the information indicating the error comprises:
   if the error is correctable,
   shielding a function of reporting the error on the storage device, and
   shielding a function of reporting the error on a switch; and
   if the error is uncorrectable,
   disabling a downstream port error suppression interrupt function on a downstream port of the switch.

2. The method according to claim 1, further comprising:
   in response to a second event indicating that a number of occurrences of a second error within the predetermined time period does not exceed the predetermined threshold, performing a first-level recovery action on the storage device.

3. The method according to claim 1, further comprising:
   if the event indicates that the number of occurrences of the error within the predetermined time period exceeds the predetermined threshold,
   initiating a hardware health check of the storage device;
   if a result of the hardware health check is benign, restoring a function of reporting the error on the storage device; and
   if the result of the hardware health check is not benign, performing a second-level recovery action on the storage device, wherein
   if the number of executions of the second-level recovery action exceeds a predefined retry count, the second-level recovery action is stopped.

4. An electronic device, comprising:
   at least one processing unit; and
   at least one memory coupled to the at least one processing unit and storing instructions for execution by the at least one processing unit, wherein the instructions, when executed by the at least one processing unit, cause the electronic device to perform actions comprising:
   obtaining information indicating an error of a storage device of a data storage system;
   if the number of occurrences of the error within a predetermined time period exceeds a predetermined threshold, stopping obtaining the information indicating the error; and
   generating an event indicating whether the number of occurrences of the error within the predetermined time period exceeds the predetermined threshold for further diagnosis of the error;
   wherein stopping obtaining the information indicating the error comprises:
   if the error is correctable,
   shielding a function of reporting the error on the storage device, and
   shielding a function of reporting the error on a switch; and
   if the error is uncorrectable,
   disabling a downstream port error suppression interrupt function on a downstream port of the switch.

5. The electronic device according to claim 4, further comprising:
   in response to a second event indicating that a number of occurrences of a second error within the predetermined time period does not exceed the predetermined threshold, performing a first-level recovery action on the storage device.

6. The electronic device according to claim 4, further comprising:
   if the event indicates that the number of occurrences of the error within the predetermined time period exceeds the predetermined threshold,
   initiating a hardware health check of the storage device;
   if a result of the hardware health check is benign, restoring a function of reporting the error on the storage device; and
   if the result of the hardware health check is not benign, performing a second-level recovery action on the storage device, wherein
   if the number of executions of the second-level recovery action exceeds a predefined retry count, the second-level recovery action is stopped.

7. A computer program product having a non-transitory computer readable medium which stores a set of instructions to perform storage management; the set of instructions, when carried out by computerized circuitry, causing the computerized circuitry to perform a method of:
   obtaining information indicating an error of a storage device of a data storage system;
   in response to a number of occurrences of the error within a predetermined time period exceeding a predetermined threshold, stopping obtaining the information indicating the error; and
   generating an event indicating whether the number of occurrences of the error within the predetermined time period exceeds the predetermined threshold for further diagnosis of the error;
   wherein stopping obtaining the information indicating the error comprises:
   if the error is correctable,
   shielding a function of reporting the error on the storage device, and
   shielding a function of reporting the error on a switch; and
   if the error is uncorrectable, disabling a downstream port error suppression interrupt function on a downstream port of the switch.

8. The computer program product according to claim 7, wherein the method further includes:
in response to a second event indicating that a number of occurrences of a second error within the predetermined time period does not exceed the predetermined threshold, performing a first-level recovery action on the storage device.

9. The computer program product according to claim 7, wherein the method further includes:
if the event indicates that the number of occurrences of the error within the predetermined time period exceeds the predetermined threshold,
initiating a hardware health check of the storage device;
if a result of the hardware health check is benign, restoring a function of reporting the error on the storage device; and
if the result of the hardware health check is not benign, performing a second-level recovery action on the storage device, wherein
if the number of executions of the second-level recovery action exceeds a predefined retry count, the second-level recovery action is stopped.

10. The method according to claim 1, wherein obtaining the information indicating the error includes:
receiving, from the switch and at a kernel space of the data storage system, the information indicating the error;
wherein the method further comprises:
in response to receiving the information, incrementing, by a driver in the kernel space, a count of the number of occurrences of error within the predetermined time period, the number of occurrences of the error within the predetermined time period exceeding the predetermined threshold.

11. The method according to claim 3, wherein performing the second-level recovery action includes:
performing a hardware reset of a component in the data storage system; and
incrementing a count of the number of executions of the secondary-level recovery action.

12. The electronic device according to claim 4, wherein obtaining the information indicating the error includes:
receiving, from the switch and at a kernel space of the data storage system, the information indicating the error;
wherein the method further comprises:
in response to receiving the information, incrementing, by a driver in the kernel space, a count of the number of occurrences of error within the predetermined time period, the number of occurrences of the error within the predetermined time period exceeding the predetermined threshold.

13. The electronic device according to claim 6, wherein performing the second-level recovery action includes:
performing a hardware reset of a component in the data storage system; and
incrementing a count of the number of executions of the secondary-level recovery action.

14. The computer program product according to claim 7, wherein obtaining the information indicating the error includes:
receiving, from the switch and at a kernel space of the data storage system, the information indicating the error;
wherein the method further comprises:
in response to receiving the information, incrementing, by a driver in the kernel space, a count of the number of occurrences of error within the predetermined time period, the number of occurrences of the error within the predetermined time period exceeding the predetermined threshold.

15. The computer program product according to claim 9, wherein performing the second-level recovery action includes:
performing a hardware reset of a component in the data storage system; and
incrementing a count of the number of executions of the secondary-level recovery action.

16. A method for storage management, comprising:
obtaining information indicating an error of a storage device of a data storage system;
if the number of occurrences of the error within a predetermined time period exceeds a predetermined threshold, stopping obtaining the information indicating the error;
generating an event indicating whether the number of occurrences of the error within the predetermined time period exceeds the predetermined threshold for further diagnosis of the error;
if the event indicates that the number of occurrences of the error within the predetermined time period exceeds the predetermined threshold,
initiating a hardware health check of the storage device;
if a result of the hardware health check is benign, restoring a function of reporting the error on the storage device; and
if the result of the hardware health check is not benign, performing a second-level recovery action on the storage device, wherein
if the number of executions of the second-level recovery action exceeds a predefined retry count, the second-level recovery action is stopped.

17. The method according to claim 16, further comprising:
in response to a second event indicating that a number of occurrences of a second error within the predetermined time period does not exceed the predetermined threshold, performing a first-level recovery action on the storage device.

18. The method according to claim 16, wherein obtaining the information indicating the error includes:
receiving, from the switch and at a kernel space of the data storage system, the information indicating the error;
wherein the method further comprises:
in response to receiving the information, incrementing, by a driver in the kernel space, a count of the number of occurrences of error within the predetermined time period, the number of occurrences of the error within the predetermined time period exceeding the predetermined threshold.

19. The method according to claim 16, wherein performing the second-level recovery action includes:
performing a hardware reset of a component in the data storage system; and
incrementing a count of the number of executions of the secondary-level recovery action.

* * * * *